United States Patent [19]
Hodsden et al.

[11] Patent Number: 5,265,740
[45] Date of Patent: Nov. 30, 1993

[54] ADJUSTABLE STORAGE APPARATUS FOR COMPUTER MEDIA

[75] Inventors: John B. Hodsden, Colorado Springs, Colo.; Dennis Hudson, La Mirada, Calif.; Allen D. Nichols, Colorado Springs, Colo.

[73] Assignee: The Winsford Corporation, Los Angeles, Calif.

[21] Appl. No.: 812,783

[22] Filed: Dec. 23, 1991

[51] Int. Cl.$^5$ .............................................. A47B 57/00
[52] U.S. Cl. ..................................... 211/187; 211/41; 211/190
[58] Field of Search ................. 211/41, 187, 190, 191, 211/192; 248/243

[56] References Cited

U.S. PATENT DOCUMENTS

| | | |
|---|---|---|
| 2,702,127 | 2/1955 | Pastorius, III et al. |
| 2,808,944 | 10/1957 | Jones et al. |
| 3,203,374 | 8/1965 | Gingher et al. |
| 3,225,937 | 12/1965 | Amthor, Jr. ........................ 211/187 |
| 3,306,466 | 2/1967 | Liston . |
| 3,772,572 | 11/1973 | Marquette . |
| 4,148,263 | 4/1979 | Suttles . |
| 4,158,998 | 6/1979 | Clements ........................ 211/191 X |
| 4,201,139 | 5/1980 | Suttles ............................ 248/243 X |
| 4,344,367 | 8/1982 | Merl . |
| 4,444,322 | 4/1984 | Lee . |
| 4,519,511 | 5/1985 | Mendenhall . |
| 4,553,486 | 11/1985 | Muhl . |
| 4,688,682 | 8/1987 | Price et al. |
| 4,730,735 | 3/1988 | Lechner . |
| 4,782,958 | 11/1988 | Price et al. |
| 4,846,355 | 7/1989 | Price, Sr. et al. |
| 4,913,296 | 4/1990 | Cournoyer . |
| 4,928,834 | 5/1990 | Neiman . |

FOREIGN PATENT DOCUMENTS

| | | |
|---|---|---|
| 738261 | 7/1966 | Canada ................................ 211/187 |
| 2555291 | 6/1977 | Fed. Rep. of Germany . |
| 3326784 | 2/1985 | Fed. Rep. of Germany . |
| 6645316 | 6/1964 | Italy . |
| 891855 | 3/1962 | United Kingdom . |

OTHER PUBLICATIONS

Mead-Hatcher, Inc., Advertisement, publication date and place unknown.
Engineered Data Products, Catalog, Printed in U.S.A. (1988).
Hon, Instruction Sheet for Adjustable Shelf File, publication date and place unknown.

Primary Examiner—Alvin C. Chin-Shue
Attorney, Agent, or Firm—Robbins, Berliner & Carson

[57] ABSTRACT

An apparatus for storage of computer media has side stands supporting adjustable shelves to accommodate computer media of varying heights, widths and depths. Brackets supporting the shelves engage with holes formed in the side stands to releasably secure the shelves over a range of heights. The shelves are L-shaped and are open on top. The shelves may have dividing tabs to facilitate the storing and dispensing of computer media and the spacing between the tabs may be varied to accommodate computer media of varying widths. A lid and a bottom are secured to the side stands to increase the apparatus' overall structural strength and rigidity. A reinforcing member extends across the bottom between the side stands to ensure that the side stands remain parallel to each other and perpendicular to the lid and bottom.

22 Claims, 4 Drawing Sheets

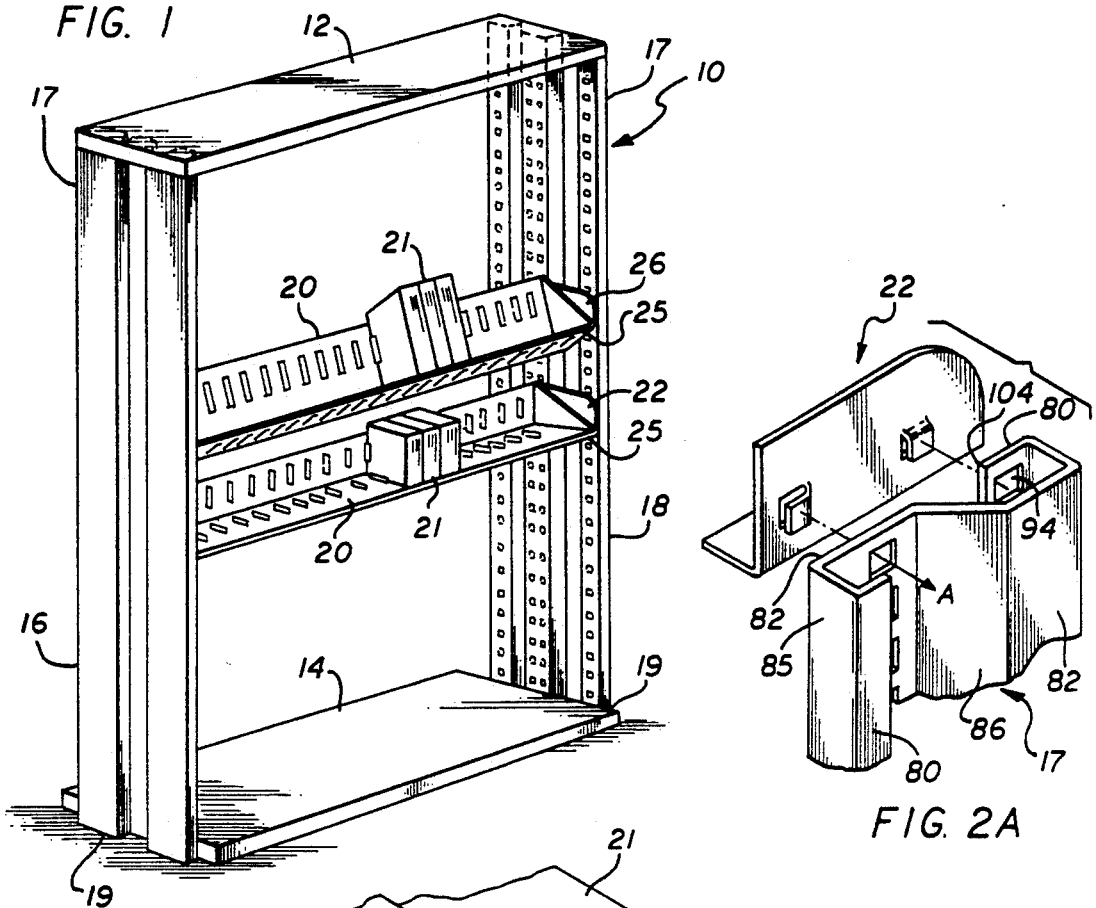
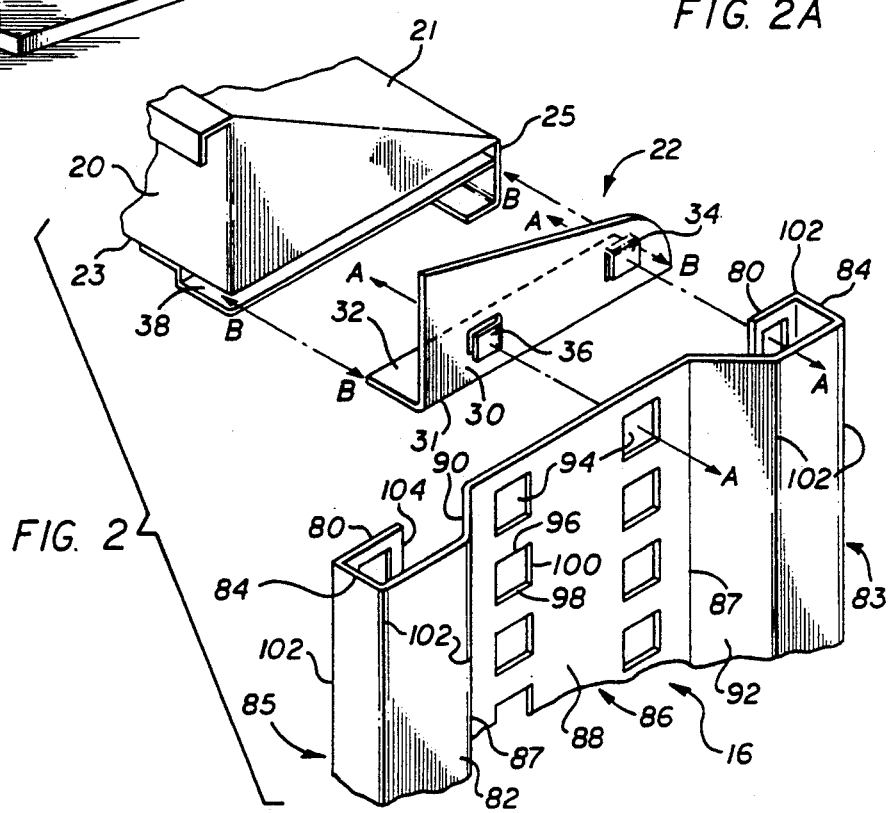

ADJUSTABLE STORAGE APPARATUS FOR COMPUTER MEDIA

FIELD OF THE INVENTION

The present invention relates generally to a storage apparatus and, more particularly, to a storage apparatus with adjustable shelves to accommodate computer media of varying shapes and sizes.

BACKGROUND OF THE INVENTION

With the ever-increasing popularity of computers, the storage of computer media poses a problem. Storage space is costly. Thus, it is essential that a storage apparatus utilizes storage space efficiently. It is, however, difficult for one particular kind of storage structure to be efficient when computer media constantly change in shape and size. For example, the once common 10½ inch reels of ferric oxide tapes have now been replaced by smaller cassettes of magnetic tapes. Thus, an efficient storage apparatus for computer media must be readily adjustable to accommodate both minor and substantial changes in shapes and sizes of computer media.

An efficient storage apparatus must also house a large quantity of computer media. It must, therefore, be extremely sturdy and solid in construction to support the weight required without movement. However, the storage apparatus should also be light weight so that it can be easily transported when necessary.

Prior storage systems for computer media have had problems. Such systems are disclosed in U.S. Pat. No. 4,913,296, issued to Cournoyer, et al, and U.S. Pat. No. 4,688,682, issued to Price, et al. These systems have fixed shelves rendering adjustment of shelf height impossible. Height adjustment is unnecessary since both patients (inventions) are directed to the storage and dispensing of one particular type of computer media.

Prior art also includes computer media storage systems providing adjustable shelves. However, the means engaging the shelves neither prevent the shelves from tipping nor facilitate a viewing, storing or dispensing of computer media. Also, the shelves of the prior art are not provided with upstanding dividers formed directly from the shelf structure so that the shelves remain light weight. Furthermore, the shelves of the prior art cannot accommodate computer media varying in depth or width.

Because apertures or slots weaken a structure, current side stands having apertures or slots often require additional support structures. Such additional structures are unnecessary in the vertical supports of present invention because its unique construction allows it to remain light without compromises in its structural strength or rigidity.

Current storage apparatuses also lack substantial overall rigidity. Since the adjustable shelves are neither welded nor otherwise fixedly mounted to the side stands, the side stands tend to not remain perpendicular to the top or bottom members if a minimal number of shelves are utilized. Unlike the prior art, the present invention allows the vertical supports to remain substantially parallel to each other and substantially perpendicular to both the top and bottom members even when no shelves are supported between the vertical supports.

The present invention fulfills the need for a rigid yet lightweight storage apparatus with angled shelves that can accommodate computer media varying in height, width and depth. The present invention also fulfills the need for lightweight shelves with upstanding dividers to facilitate the storing and dispensing of individual computer media. The present invention further fulfills the need for computer media storage apparatus resembling currently-existing storage apparatus so that the two apparatus may be used in close proximity without being unsightly.

SUMMARY OF THE INVENTION

The present invention relates to a rigid yet lightweight apparatus for the storage of computer media of varying shapes and sizes. The storage apparatus is adjustable to accommodate computer media varying in height, width and depth.

In the preferred embodiment of the invention, the storage apparatus comprises at least two vertical supports, each having at least two pairs of vertically aligned apertures, L-shaped shelves having a rear panel and a bottom panel but being open on top, L-brackets releasably securing the ends of the shelf to the vertical support apertures, and a top and a reinforced bottom member for providing overall rigidity.

By using one type of L-bracket, the shelves can be supported at an angle to facilitate the storing, dispensing and viewing of the media. The angled support also enables the shelves to better retain the media during physical disturbances such as earthquakes or the transporting of the storage apparatus.

The L-brackets have tangs which clip into apertures formed in the vertical supports. These tangs support and prevent the shelves from tipping when a downward pressure is applied either to the front or rear edges of the shelves. Thus, the shelves are substantially stable and fixed upon engagement to the vertical supports.

The shelves preferably have a continuous construction which, when folded, provides considerable strength and rigidity. In one embodiment, upstanding dividers are provided in the shelves to facilitate the individual storing and dispensing of computer media. These dividers do not increase the weight of the shelves since they are cut and formed from the existing shelf structure.

The present invention has a folded construction which provides the requisite structural strength that would otherwise be lacking as a result of the apertures being formed in the vertical supports.

Maximum storage capacity is achieved in the present invention by vertically spacing the apertures in the vertical supports a selected distance apart. The vertical supports have pairs of apertures vertically and horizontally aligned so computer media may be stored on both sides of the present apparatus for maximum storage efficiency.

A bottom member is rigidly fixed to the lower ends of the vertical supports while a top member extends over and around the upper ends of the vertical supports for providing substantial overall stability and rigidity. The bottom member is reinforced to provide a straight-line structural brace between the vertical supports so that they remain both parallel to each other and perpendicular to the top and bottom member.

BRIEF DESCRIPTION OF THE DRAWINGS

The above and other features of the present invention may be more fully understood from the following detailed description, together with the accompanying drawings, wherein similar reference characters refer to similar elements through and in which:

FIG. 1 is a perspective view of an storage apparatus of the preferred embodiment.

FIG. 2 is an exploded perspective view of an L-shaped shelf, L-bracket and an vertical support of FIG. 1.

FIG. 2A an exploded perspective view of an L-bracket and a single-sided vertical support.

DESCRIPTION OF THE PREFERRED EMBODIMENTS

Figure 3:
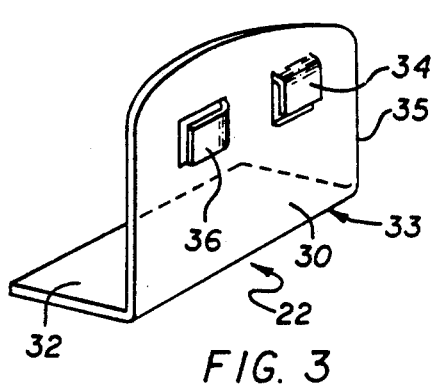
FIG. 3 is a perspective view of the L-bracket.

Referring now to the drawings, FIG. 1 shows a storage apparatus for computer media 10, constructed in accordance with the preferred embodiment of the invention. Two vertical support members 16 and 18 are connected at their upper and lower ends 17 and 19 by a top member 12 and a bottom member 14, respectively. The top member 12 and the bottom member 14 are rigidly secured, such as by welding, to the vertical supports 16 and 18 to provide overall structural strength and rigidity. Two L-shaped shelves 20, storing a plurality of computer media 21, are supported between the vertical supports 16 and 18 by pairs of L-brackets 22 and 26, which enable height adjustment of the shelves 20 for accommodating the computer media 21 of varying height.

Referring to FIGS. 2 and 3, the L-bracket 22 has a vertical leg 30, and a lateral leg 32 extending normally from the bottom edge 31 of the vertical leg 30. The vertical leg 30 engages the vertical support 16, and the lateral leg engages the shelf 20.

The vertical leg 30 is provided with a downwardly-facing tang 34, and a rearwardly-facing tang 36. Both tangs 34 and 36 are cut from the vertical leg 30 and bent outwardly and then inwardly for releasably engaging the vertical support 16 as indicated in the FIG. 2 along lines A in FIG. 2. The downwardly-facing tang 34 secures the shelf 20 to the vertical support 16 and provides vertical support. The rearwardly-facing tang 36 engages the vertical support 16 and prevents the shelf 20 from either tipping forward if a downward pressure is applied to the front edge 21 of the shelf 20, or tipping backwards if a downward pressure is applied to the rear edge 23. It is preferred that the tangs 34 and 36 be of square shape having sides no larger than 0.5 inch. It is also preferred that the tangs 34 and 36 be spaced 2.5 inches apart.

Figure 4:
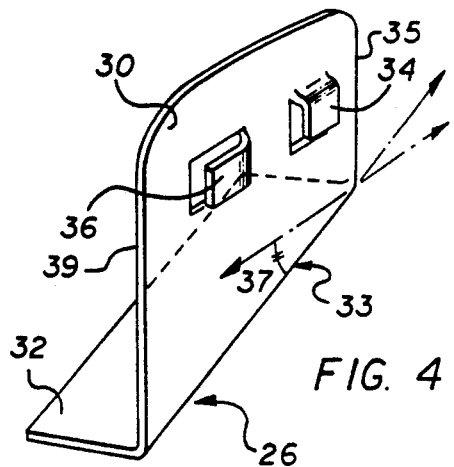
FIG. 4 is a perspective view of an inclined L-bracket.

Referring now specifically to FIGS. 3 and 4, the L-brackets 22 and 26 are of a continuous construction for strength, and the vertical legs 30 and lateral legs 32 are formed from folding the continuous construction along folds 33. The fold 33 of L-bracket 22 is substantially normal to its edge 35 for supporting the shelf 20 horizontally level. However, the fold 33 of L-bracket 26 is substantially at an angle 37 from the normal of its edge 35 so that the shelf 20 may be substantially supported at the angle 37 from the vertical. Angling the shelf 20 at the angle 37 facilitates the viewing, storing and dispensing of the media 21, and also enables the shelf 20 to better retain the media 21 during physical disturbances such as transport of the storage apparatus 10, or minor earthquakes. It is preferred that the angle 37 be approximately 15 degrees.

For either of the L-brackets 22, or 26, it is further preferred that the depth of the vertical legs 30 be 5.25 inches. For the L-bracket 22, it is preferred that the height of the vertical leg 30 be 2.0 inches. However, for the L-bracket 26, it is preferred that the height of the vertical leg 30 be 1.75 inches at the edge 35, and gradually increasing to 3.0 inches at opposed edge 39.

Figure 5:
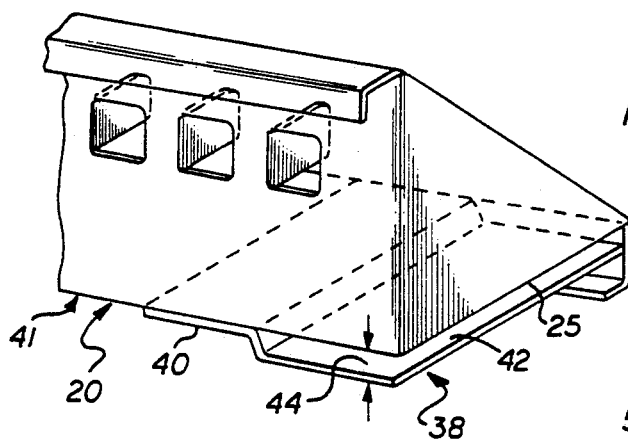
FIG. 5 is a perspective view of the L-shaped shelf having a retainer engageable with the L-bracket.

Referring now to FIGS. 1, 2 and 5, although a pair of the L-brackets 26 alone can adequately support the shelf 20, it is preferred that a pair of shelf retainers 38 be rigidly secured to underside 41 of shelf ends 25 for securing the shelf 20 to the lateral legs 32 of the L-brackets 26, and to counteract any upward pressure applied to the shelf underside 41.

In the preferred embodiment, the shelf retainer 38 is substantially a panel being bent for forming a first portion 40 and a second portion 42. The first portion is welded or otherwise rigidly secured to the underside 41, while the second portion 42 extends away from the underside 41 for defining a space 44 between the second portion 42 and the underside 41. To engage the shelf 20, the lateral leg 32 of the L-bracket 22 is inserted into space 44 as shown along lines B—B in FIG. 2, whereupon the shelf 20 is rendered releasably secured to the vertical support 16.

Figure 6:
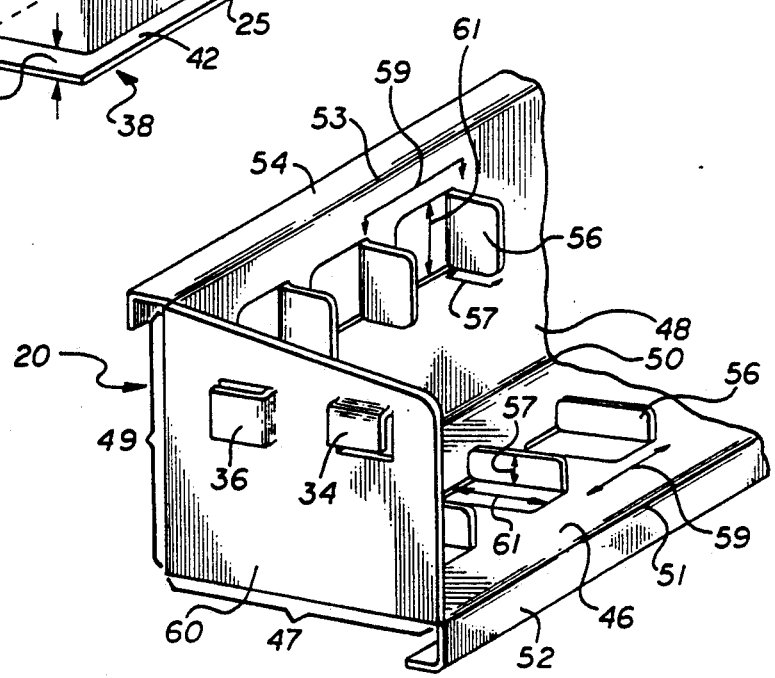
FIG. 6 is a perspective view of the L-shaped shelf having a downwardly-facing and a rearwardly-facing tang formed in an end, panel of the shelf.

Referring now to FIGS. 5 and 6, the shelf 20 is substantially L-shaped having a bottom panel 46 with depth 47 and a rear edge 50. A rear panel 48 with height 49 extends normally from the rear edge 50 of the bottom panel 46. Since the depth 47 and the height 49 of the shelf 20 need only conform to the depth and height of the computer media 21, the depth 47 and the height 49 need not be limited by the design of the vertical supports 16 and 18.

The bottom panel 46 of the shelf 20 has a rear edge 50, and the rear panel 48 extends normally from the rear edge 50. It is preferred that the shelf 20 be of a continuous construction for strength and rigidity. The bottom panel 46 and the rear panel 48 are formed by folding the continuous construction at the rear edge 50 of the bottom panel 46.

In this embodiment, the shelf 20 is 34 inches long. Furthermore, according to currently existing computer media, it is preferred that the depth 47 be either 2.5 or 3.7 inches, and the height 49 be either 3.5 or 4.0 inches, respectively.

Referring now specifically to FIG. 6, it is also preferred that an inwardly-facing L-shaped flange 52 be provided along the front edge 51 of the bottom panel 46 to add overall strength and rigidity to the shelf 20. The flange 52 also serves to retain the lateral leg 32 of the L-bracket 26 inside the space 44 thereby preventing the shelf 20 from slipping off the lateral leg 32 of L-bracket 26 while being supported at an angle 37 from the vertical. The flange 52 may be formed by folding frontal portion of the front edge 51 of bottom panel 46 downwardly and inwardly.

A downwardly-facing L-shaped flange 54 may also be provided along upper edge 53 of the rear panel 48 to add strength and rigidity to the shelf 20. The flange 54 may be formed by folding frontal portion of the upper edge of the rear panel 48 rearwardly and downwardly.

In accordance with the preferred embodiment of the shelf 20, width of each leg of the L-shaped flanges 52 and 54 is not greater than 0.5 inch.

To further facilitate the storing, dispensing and viewing of the computer media, dividers 56 may be provided in either of the shelf panels 46 and 48. To keep the shelf 20 light weight, the upstanding dividers 56, having a height 57 and length 61, may be formed directly from the panels 46 and 48 by cutting and bending portions of the panels 46 and 48 so that the dividers 56 extend normally therefrom. Adjacent dividers 56 are separated by a spacing 59 which need only be dependent upon the width of the computer media 21 stored or expected to be stored on the shelf 20.

Since the dividers 56 are cut from the panels 46 and 48, the height 57 cannot equal the width spacing 59, and it is preferred that the height 57 be no greater than three-quarters of the width spacing 59 so that the shelf 20 may retain the requisite strength and rigidity. The length 61 of divider 56 in the bottom panel 46 also cannot equal the depth 47 of the bottom panel 46 and it is preferred that the length 61 also be no greater than three-quarters of the depth 47 so that the shelf 20 may retain the requisite strength and rigidity. Moreover, the length 61 of divider 56 of the rear panel 48 cannot equal the rear panel height 49, and it is preferred that the length 61 be no greater than one-quarter of the rear panel height 49.

Referring now specifically to FIG. 6, another embodiment of the present invention has the tangs 34 and 36 being formed directly in the shelf 20. In this embodiment, the shelf 20 is equipped with end panels 60 which are substantially normal and rigidly secured to the panels 46 and 48. Here, neither of the L-brackets 22 and 26 are necessary as the end panels 60 have tangs 34 and 36 to directly releasably secure the shelves 20 to the vertical support 16.

Figure 7:
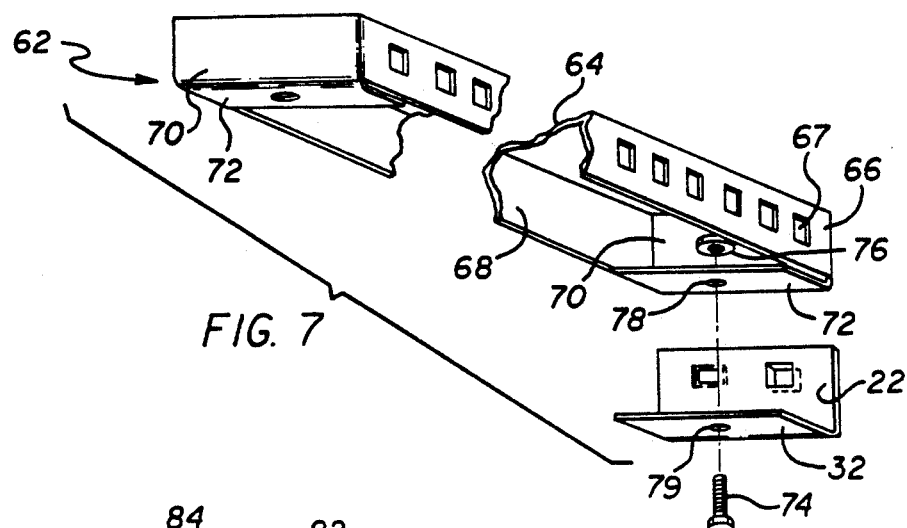
FIG. 7 is a bottom perspective view of a flat shelf and the L-bracket constructed according to a preferred embodiment.

Although the preferred embodiment of the shelf 20 comprises a bottom and a rear panel, the shelf 20 may be constructed solely according to the shape and size of the computer media 21. For instance, referring now to FIG. 7, a flat shelf 62 may be provided for storage of computer media. The flat shelf 62 being substantially rectangular has a surface 64 which is surrounded by a front and rear depending flanges 66, 68 and two opposed, end flanges 70 to add strength and rigidity to the flat shelf 62. The front depending flange 66 may have holes or slots 67 formed therein for allowing computer media to be hung from the holes or slots 67.

Each of the end flanges 70 has an inwardly-facing leg 72 for engaging the lateral leg 32 of the L-bracket 22. It is preferred that the flat shelf 62 also be of a continuous construction for strength and rigidity. Since the flat shelf 62 is not provided with the rear panel 48, it is preferred that the shelf 62 be supported horizontally level by a pair of the L-brackets 22, and not at the angle 37 from the vertical by a pair of the L-brackets 26.

As the flat shelf 62 is not provided with the shelf retainer 38, the flat shelf 62 is releasably engaged with the L-bracket 22 by a bolt 74 and a nut 76. The bolt 74 is inserted through a plurality of holes 78 and 79 provided in the lateral legs 72 of the flat shelf 62 and the lateral legs 32 of the L-brackets 22, respectively. The nut 76 is screwed onto the bolt 74 to secure the bolt 74. As with the L-shaped shelf 20, the tangs 34 and 36 may also be formed directly in end edges 70 rendering the L-brackets 22 unnecessary.

Referring to FIG. 2, the preferred embodiment of the present invention is double-sided for storing computer media on both sides of the storage apparatus. In this embodiment, the vertical support 16 has two opposed U-shaped channels 83 and 85, where each channel has a first leg 80, a second leg 82 and a base 84. The second legs 82 are rigidly connected by a panel 86 which is bent along two folds 87 to form a center section 88 and two connecting sections 90 and 92. The three sections 88, 90 and 92 are configured so that the center section 88 is substantially coplanar with first legs 80, and each of the connecting sections 90 and 92 are at a diagonal from the center section 88 to one of the second legs 82.

Horizontal pairs of vertically aligned apertures 94 are formed in both of the first legs 80 and the coplanar section 88 so that the tangs 34 and 36 releasably secure the shelf 20 to the vertical supports 16 and 18. Each aperture 94 has a top, a bottom and two side edges 96, 98 and 100. Since the tangs 34 and 36 are preferably of square shape having a length of 0.5 inch, it is preferred that each aperture 94 also be of a square shape having edges 96, 98 and 100 all substantially equal to 0.5 inch. Since the tangs 34 and 36 are preferably 2.5 inches apart, it is further preferred that the horizontal distance between the aperture sides edge 100 of the pairs of apertures 94 in the coplanar section 88 and the adjacent first legs 80 be 2.5 inches. It is also further preferred that the horizontal distance between the side edges 100 of the pairs of apertures in the coplanar section 88 be 3.0 inches.

It is additionally preferred that the vertical distance between each the top edges 88 of adjacent apertures be 1.75 inches for maximum storage capacity.

Since holes or slots weakens a structure, it is preferred that the vertical supports 16 and 18 be of a continuous construction, and that the connecting panel 86 and the two opposed U-shaped channels 83 and 85 be formed by bending the continuous construction along folds 102. The folds 102 ensure that the vertical supports 16 and 18 have the requisite strength and rigidity to support a large quantity of computer media without the aid of additional support members.

In one embodiment, the vertical supports 16 and 18 are 6.5 feet in height, the first leg 80 is 2.0 inches wide, the second leg 82 is 2.75 inches wide, the base 84 is 1.0 inch wide, the connection sections 90 and 92 are each 2.0 inches wide, and the center section 88 is 4.0 inches wide. These elements are configured so that the total distance between opposed bases 84 of each of the vertical supports 16 and 18 is 12.0 inches.

Referring now to FIG. 2A, the present invention may also be single-sided for storing computer media on one side of the storage apparatus. In this embodiment, each of vertical supports 17 and 19 (19 not shown) comprises of the two U-shaped channels 83 and 85, wherein the second legs 82 are diagonally connected by the panel 86 so that the first leg 80 of one of the channels is coplanar with the second leg 82 of the opposing channel. The apertures 94 are thus formed in the first leg 80 of channel 83 and the second leg 82 of channel 85. In this embodiment, the first legs 80 are each 2.0 inches wide, the bases 84 are each 1.0 inch wide, the second legs 82 are each 2.75 inches wide, and the connecting panel 86 is 2.0 inches wide.

Figure 8:
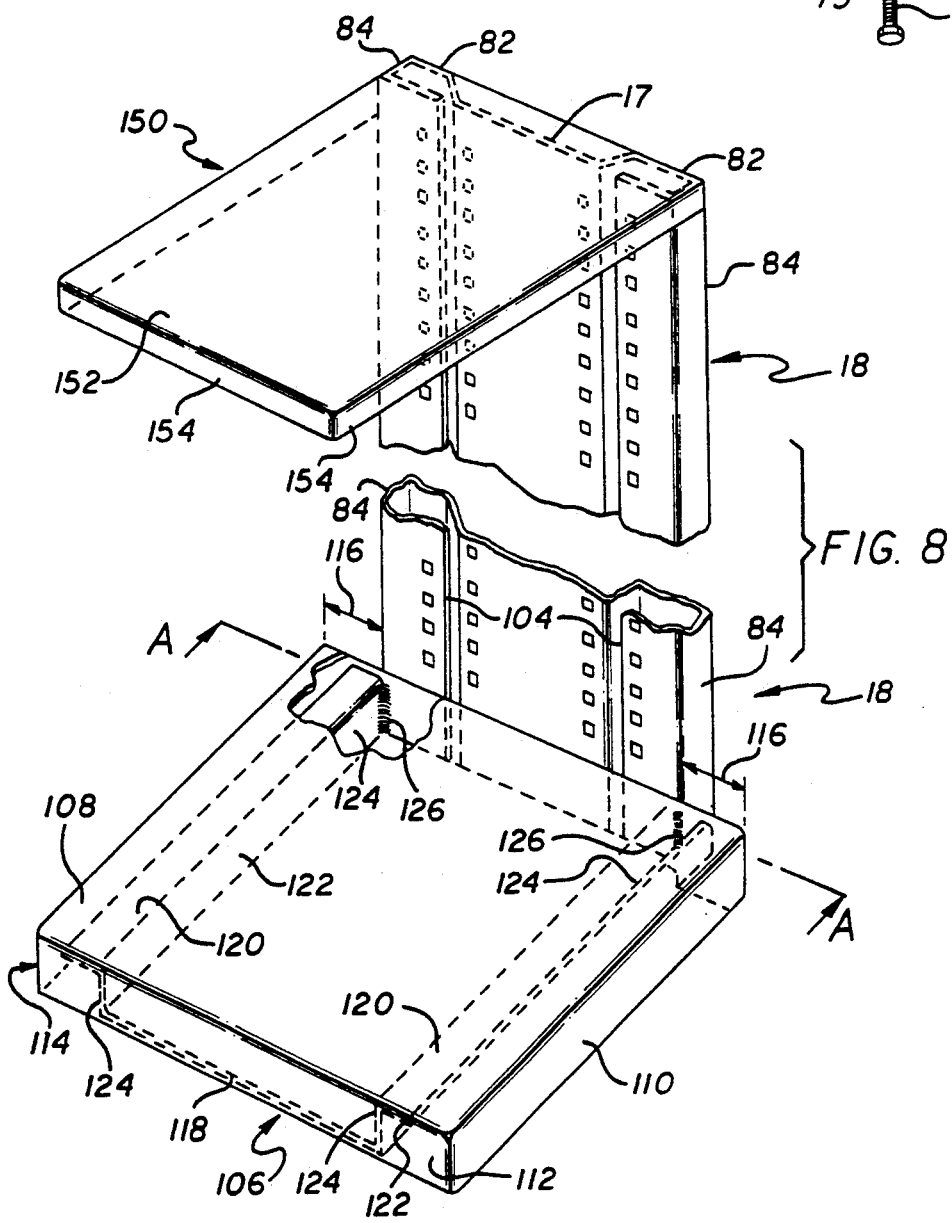
FIG. 8 is a perspective view of a top member and a bottom member, constructed according to a preferred embodiment, connected to the vertical support.

Referring now to FIGS. 2, 2A and 8, whether the present invention be single-sided or double sided, the design and folds 102 of the vertical supports 16 and 18, and 17 and 19 are configured to provide the first legs 80 with a free edge 104 so that the first legs 80 retain a minimal amount of flexibility to facilitate clipping of the downwardly-facing tangs 34 into apertures 94.

Figure 8A:
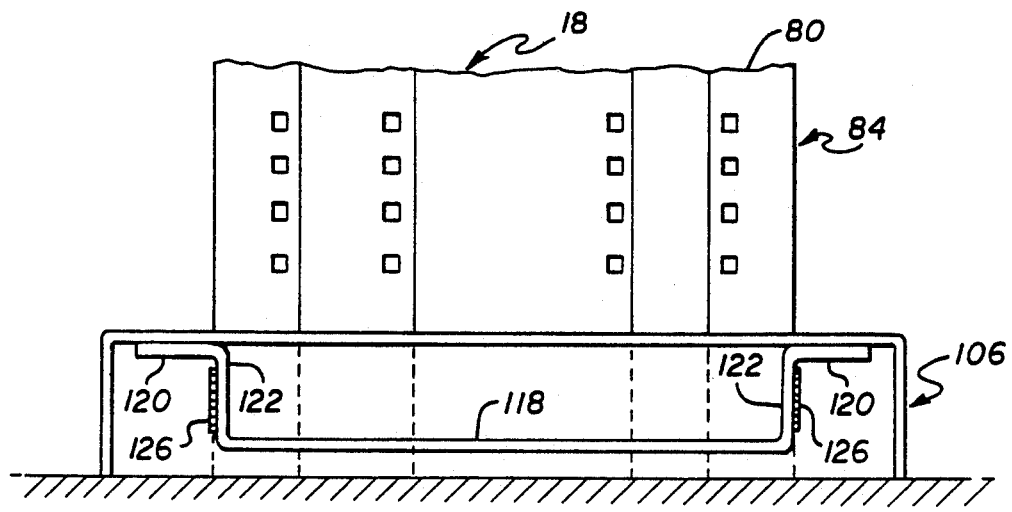
FIG. 8A is an elevational view taken along lines A—A of FIG. 8.

Referring now to FIGS. 8 and 8A, a bottom member 106 increases overall structural strength and stability. The bottom member 106 has a platform 108 with a front, a rear and side depending flanges 110, 112 and 114, respectively. The bottom member 106 is positioned between the vertical supports 16 and 18 (16 not shown), and are welded or otherwise rigidly secured to thereto.

The bottom member 106 is configured so that the front and rear flanges 110 and 114 project a predetermined distance 116 beyond the channel bases 84 of the vertical supports for providing vertical stability when particularly heavy media is stored in upper portions of the storage apparatus. The distance 116 is dependent in part on height of the present storage apparatus 10.

In accordance with the preferred embodiment of the vertical supports 16 and 18, the bottom member 106 is 34 inches by 12 inches, the depending flanges 110, 112 and 114 thereof are each 2.0 inches in height, and the predetermine distance 116 is 1.6 inches.

A reinforcing member 118 is provided to rigidly position the vertical supports 16 and 18 substantially perpendicular to the bottom member 106. Welded or otherwise rigidly secured to the bottom member 106, the reinforcing member 118 has parallel portions which traverse the bottom member 106 to extend between the vertical supports 16 and 18. Each of the parallel portions are substantially coplanar to the adjacent channel bases 84 in the vertical supports. Specifically, the reinforcing member 118 is substantially U-shaped with flanges 120 extending outwardly from legs 122. The flanges 120 are welded or otherwise fixedly secured to the underside of the bottom member 106, and edges 124 of the legs 122 are welded to the side flanges 112 of the bottom member 106 at 126. Being substantially coplanar with the adjacent channel bases 84, the welding 126 of leg edges 124 provides a straight-line structural brace between the reinforcement member 118 and the Vertical supports 16 and 18, which renders the overall structure to be rigid irrespective of the number of shelves supported between the vertical supports 16 and 18. With the reinforcing member 118, the vertical supports 16 and 18 remain substantially parallel to each other and perpendicular the bottom member 106.

To provide the straight-line structural brace to the channel bases 84, it is preferred that the distance between the legs 122 of the bottom reinforcement member 118 also be 12.0 inches. For the bottom member 106 to sit evenly and completely on a floor, the height of the reinforcing legs 122 should not be greater than the height of the depending flanges 110, 112 and 114. However, in order for the welding 126 to provide sufficient structural brace to the vertical supports 16 and 18, the height of the reinforcing legs 122 should not be less than three quarters of the height of the depending flanges 110, 112 and 114.

Figure 9:
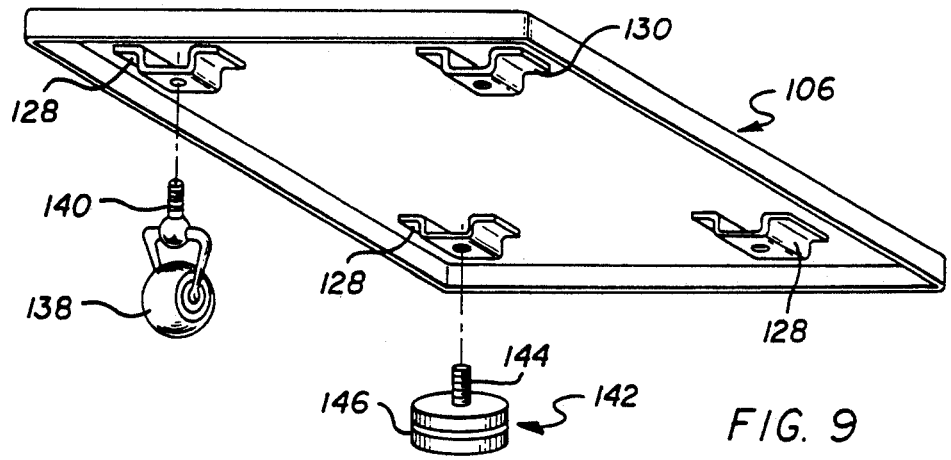
FIG. 9 is a perspective view of the bottom member provided with mounting members for securing either wheels or levelling members.
Figure 9A:
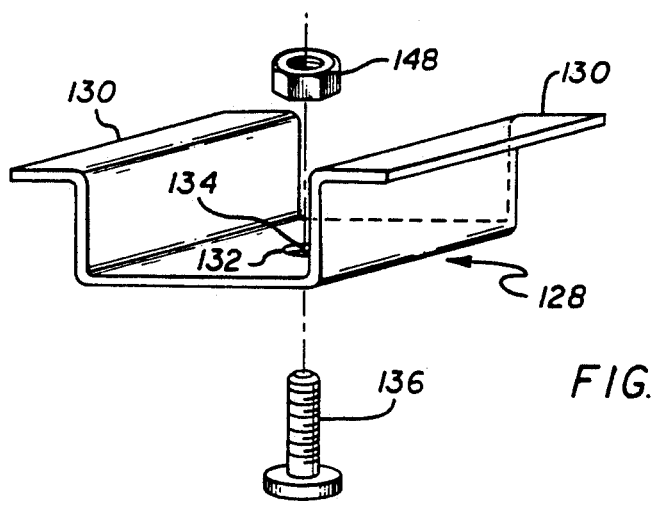
FIG. 9A is an exploded view of one of the mounting members with a levelling member.

Referring now to FIGS. 9 and 9A, the bottom member 106 (reinforcement member 118 not shown) may also be equipped with a plurality of members adapted for mounting either horizontal levelling devices, or wheels for rendering the present apparatus mobile and transportable. To do so, it is necessary that a plurality of mounting members 128 be welded or otherwise fixedly secured to the underside of the bottom member 106. Each of the mounting members 128 has a portion 130 suitable for mounting against the underside of bottom member 106, and preferably has a region 132 defining a hole 134 for receiving a bolt or a screw 136. Wheel attachments 138 having a screw 140, or levelling devices 142 having a screw 144 and a foot 146, may then be secured to the first members 106 by a nut 148.

Referring back to FIG. 8, a top member 150 may also be provided to further increase overall structural strength and rigidity. The top member 150 has a panel 152 which extends over the upper ends of the vertical supports 16 and 18. A plurality of flanges 154 depend from the edges of the panel 122 so that the second legs 82 and the bases 84 of the vertical supports 16 and 18 are welded or otherwise rigidly fixed to the inner surfaces of the flanges 154. In accordance with the preferred embodiment of the present invention, the top member is 36 inches by 12 inches, and the depending flanges 154 have a height of 2.0 inches.

For overall structural strength and rigidity, it is preferred that all the elements of the present invention be constructed of 18 gauge cold rolled steel, or other material comparable in strength and rigidity.

Although the invention has been described in terms of a preferred embodiment thereof, other embodiments that are apparent to those of ordinary skill in the art are also within the scope of the invention. For example, the vertical supports, the shelves, the brackets and other elements of the present invention are not limited to the dimensions set forth herein. Furthermore, the shelves are not limited to the L-shaped or the flat shelves described herein. Moreover, the present invention may be either a stationary storage apparatus or a mobile storage cart. Accordingly, the scope of the invention is intended to be defined only by reference to the appended claims.

What is claimed is:

1. An adjustable storage apparatus, comprises:
    at least two vertical supports, each support having two opposed U-shaped channels, each channel having a base, a first and a second leg, wherein said second legs are rigidly connected together, and wherein the first leg of one channel has a first surface with a first aperture and a second aperture, wherein the second leg of the other one channel has a second surface parallel to said first surface with a third aperture and a fourth aperture, and wherein the first aperture is horizontally aligned with the third aperture, and the second aperture is horizontally aligned with the fourth aperture;
    at least one shelf; and
    means for releasably securing the shelf to the apertures over a range of heights between said supports, comprising two tangs for engaging two horizontally aligned apertures.

2. The storage apparatus of claim 1 wherein one of said two tangs is downwardly-facing and the other one of said two tangs is rearwardly-facing.

3. The storage apparatus of claim 1 wherein said securing means comprises:

at least one pair of L-brackets, each bracket having a vertical leg, and a lateral leg normal to and extending inwardly from bottom of the vertical leg;

a downwardly-facing and a rearwardly-facing tang both formed in each of the vertical legs.

4. The storage apparatus of claim 3 further comprise:

one pair of shelf retainers, each retainer having a portion rigidly secured to underside of shelf ends and another portion extending away from the underside defining a space between the second portion and the underside.

5. The adjustable storage apparatus of claim 3 wherein:

the lateral leg of the bracket is inclined downwardly from the front edge of the bracket.

6. The storage apparatus of claim wherein said supports further comprises:

a plurality of vertically aligned apertures formed in each of the first legs; and a panel connecting said second legs, said panel having a portion being substantially coplanar with said first legs, said portion having at least two pairs of vertically aligned apertures.

7. The storage apparatus of claim 1 further comprises:

a top member rigidly secured to upper ends of the supports;

a bottom member rigidly secured to lower ends of the supports; and means for rigidly positioning the supports substantially perpendicular to the bottom member.

8. The storage apparatus of claim 7 wherein said rigidly positioning means comprises:

at least two legs traversing the bottom member to extend between the vertical supports, said legs and edge portions thereof being substantially coplanar with the adjacent channel bases, and said leg edge portions being rigidly secured to the bottom member.

9. The storage apparatus of claim 1 wherein said shelf is substantially L-shaped, having a rear panel and a bottom panel but being open on top, said panels being substantially perpendicular to each other.

10. The storage apparatus of claim 9 wherein said shelf further comprises:

an inwardly-facing L-shaped flange depending from front edge of the bottom panel.

11. The storage apparatus of claim 10 wherein said shelf further comprises:

a plurality of upstanding dividers formed from tabs being partially cut from said panels, said tabs being bent to extend normally therefrom.

12. The adjustable storage apparatus of claim 1 where in each vertical support is formed from one continuous sheet of metal.

13. The adjustable storage apparatus of claim 7 further comprising:

means for mobilizing said storage apparatus.

14. The adjustable storage apparatus of claim 13 wherein said mobilizing means comprises:

at least one member having a wheel;

at least one mounting member rigidly secured to underside of the bottom member; and means for attaching said wheeled member to said mounting member.

15. An adjustable storage apparatus for storage of computer media comprising:

at least two vertical supports, each support having two opposed U-shaped channels, each channel having two legs and a base connecting the legs, said channels being rigidly connected by a panel configured to provide a portion substantially coplanar with one leg of each channel, said legs and said coplanar portion having a plurality of vertically aligned apertures formed therein;

a top member welded to upper ends of supports;

a bottom member welded to lower ends of supports, said bottom member having a platform with front and rear edges thereof extending beyond the adjacent support bases, and said platform having flanges depending from the edges thereof;

a U-shaped reinforcing member with outwardly-extending flanges extending from two parallel legs, said outwardly-extending flanges welded to underside of the bottom member, said legs being substantially coplanar with the adjacent channel bases of the vertical supports, and edge of each of said legs welded to side depending flanges of the bottom member;

at least one L-shaped shelf having panels, said panels having upstanding dividers formed from portions of the panels;

at least one pair of L-brackets, each bracket having a vertical leg, and a lateral leg normal to and extending inwardly from bottom of the vertical leg, said vertical leg having a downwardly-facing tang and a rearwardly-facing tang formed therein; and at least one pair of shelf retainers, each retainer having a portion mounted to underside of shelf ends and another portion extending away from the underside defining a space between the second portion and the underside.

16. The storage apparatus of claim 15 further comprising:

at least four members having a wheel and a bolt;

at least four mounting members mounted to the underside of the bottom member; each of said mounting members having a region defining a hole for receiving said bolt.

17. An adjustable storage apparatus, comprises:

at least two vertical supports, each support having two opposed U-shaped channels, each channel having a base, a first and a second leg, said second legs being rigidly connected together, and either of said first or second legs having a plurality of vertically aligned apertures formed therein, at least one shelf, and means for releasably securing the shelf to the apertures over a range of heights between said supports, comprising:

at least one pair of L-brackets, each bracket having a vertical leg and a lateral leg normal to and extending inwardly from bottom of the vertical leg, and a downwardly-facing and a rearwardly-facing tang both formed in each of the vertical legs.

18. The storage apparatus of claim 17, further comprises one pair of shelf retainers, each retainer having a portion rigidly secured to underside of shelf ends and another portion extending away form the underside defining a space between the second portion and the underside.

19. The adjustable storage apparatus of claim 17, wherein the lateral leg of the bracket is inclined downwardly from the front edge of the bracket.

20. An adjustable storage apparatus, comprises:

at least two vertical supports, each support having two opposed U-shaped channels, each channel having a base, a first and a second leg, said second legs being rigidly connected together, and either of said first or second legs having a plurality of vertically aligned apertures formed therein, said supports further comprising a plurality of vertically aligned apertures formed in each of the first legs, and a panel connecting said second legs, said panel having a portion being substantially coplanar with said first legs, said portion having at least two pairs of vertically aligned apertures.

at least one shelf, and means for releasably securing the shelf to the apertures over a range of heights between said supports.

21. An adjustable storage apparatus, comprise:

at least two vertical supports, each support having two opposed U-shaped channels, each channel having a base, a first and a second leg, said second legs being rigidly connected together, and either of said first or second legs having a plurality of vertically aligned apertures formed therein, at least one shelf, and means for releasably securing the shelf to the apertures over a range of heights between said supports, wherein said shelf is substantially L-shaped, having a rear panel and a bottom panel but being open on top, said panels being substantially perpendicular to each other, and further comprises an inwardly-facing L-shaped facing large depending from front edge of the bottom panel, and a plurality of upstanding dividers formed from tabs being partially cut from said panels, said tabs being bent to extend normally therefrom.

22. An adjustable storage apparatus, comprises:

at least two vertical supports, each support having two opposed U-shaped channels, each channel having a base, a first and a second leg, said second legs being rigidly connected together, and either of said first or second legs having a plurality of vertically aligned apertures formed therein, at least one shelf, and means for releasably securing the shelf to the apertures over a range of heights between said supports, comprising a downwardly-facing and a rearwardly-facing tang provided at each shelf end.

* * * * *

UNITED STATES PATENT AND TRADEMARK OFFICE
CERTIFICATE OF CORRECTION

PATENT NO. : 5,265,740

DATED : November 30, 1993

INVENTOR(S) : Hodsden et al

It is certified that error appears in the above-indentified patent and that said Letters Patent is hereby corrected as shown below:

Col. 1, line 17, delete "change" and insert --changes--.

Col. 1, line 23, after "in" insert --the--.

Col. 1, line 36, delete "patients" and insert --patents--.

Col. 1, line 51, after "of" insert --the--.

Col. 3, line 3, delete "an" and insert --a--.

Col. 3, line 6, delete "an" and insert --a--.

Col. 3, line 13, after "a" insert --shelf--.

UNITED STATES PATENT AND TRADEMARK OFFICE
CERTIFICATE OF CORRECTION

PATENT NO. : 5,265,740
DATED : November 30, 1993
INVENTOR(S) : Hodsden, et al

It is certified that error appears in the above-indentified patent and that said Letters Patent is hereby corrected as shown below:

Col. 3, line 16, after "end" delete ",".

Col. 6, line 42, after "each" insert --of--.

Col. 7, line 56, after "perpendicular" insert --to--.

Col. 9, lines 52 and 53, delete "where in" and insert --wherein--.

Col. 11, line 10, delete "." and insert --;--.

Col. 12, line 8, change "large" to --flange--.

Signed and Sealed this

Sixteenth Day of August, 1994

Attest:

BRUCE LEHMAN

Attesting Officer

Commissioner of Patents and Trademarks